(12) United States Patent
Stoff et al.

(10) Patent No.: US 11,566,381 B2
(45) Date of Patent: Jan. 31, 2023

(54) TAMPING ASSEMBLY FOR TAMPING SLEEPERS OF A TRACK

(71) Applicant: PLASSER & THEURER EXPORT VON BAHNBAUMASCHINEN GMBH, Vienna (AT)

(72) Inventors: Silvio Stoff, Walding (AT); Samuel Wollanek, Pregarten (AT)

(73) Assignee: Plasser & Theurer Export von Bahnbaumaschinen GmbH, Vienna (AT)

( * ) Notice: Subject to any disclaimer, the term of this patent is extended or adjusted under 35 U.S.C. 154(b) by 306 days.

(21) Appl. No.: 16/763,131

(22) PCT Filed: Nov. 21, 2018

(86) PCT No.: PCT/EP2018/081997
§ 371 (c)(1),
(2) Date: May 11, 2020

(87) PCT Pub. No.: WO2019/120834
PCT Pub. Date: Jun. 27, 2019

(65) Prior Publication Data
US 2020/0392671 A1 Dec. 17, 2020

(30) Foreign Application Priority Data
Dec. 21, 2017 (AT) .................. A 492/2017

(51) Int. Cl.
*E01B 27/16* (2006.01)

(52) U.S. Cl.
CPC .......... *E01B 27/16* (2013.01); *E01B 2203/12* (2013.01)

(58) Field of Classification Search
CPC .......... E01B 27/16; E01B 27/17; E01B 27/20; E01B 35/00; E01B 35/02; E01B 35/04;
(Continued)

(56) References Cited

U.S. PATENT DOCUMENTS 3,039,012 A * 6/1962 Bruninghaus .......... H02K 33/04
310/29
3,621,786 A * 11/1971 Joy ........................ E01B 27/16
104/12
(Continued)

FOREIGN PATENT DOCUMENTS

AT 350097 B 5/1979
EP 1130164 A1 9/2001
(Continued)

*Primary Examiner* — Zachary L Kuhfuss
*Assistant Examiner* — Cheng Lin
(74) *Attorney, Agent, or Firm* — Laurence A. Greenberg; Werner H. Stemer; Ralph E. Locher

(57) ABSTRACT

The invention relates to a tamping assembly for tamping sleepers (2) of a track (3), comprising a tamping unit (1) having a lowerable tool carrier (4) and oppositely positioned tamping tools (5), wherein each tamping tool (5) is connected via a pivot arm (6) to a squeezing drive (7) for generating a squeezing motion, and wherein a vibration drive (8) is provided for actuation of the tamping tools (5) with a vibratory motion. In this, it is provided that the vibration drive (8) comprises an electromagnetic actuator (11).

13 Claims, 2 Drawing Sheets

(58) Field of Classification Search
CPC ............ E01B 2203/10; E01B 2203/12; E01B 2203/122; E01B 2203/127; E01B 29/00; E01B 29/16; E01B 29/20; H02K 35/00; H02K 35/02; H02K 35/04; H02K 35/06; B06B 1/045

See application file for complete search history.

(56) References Cited

U.S. PATENT DOCUMENTS

| | | | | |
|---|---|---|---|---|
| 3,739,465 | A * | 6/1973 | Romer | G05D 23/128 |
| | | | | 310/15 |
| 4,240,352 | A * | 12/1980 | Theurer | E01B 27/16 |
| | | | | 104/12 |
| 4,312,275 | A * | 1/1982 | Theurer | E01B 27/16 |
| | | | | 104/12 |
| 6,401,623 | B2 * | 6/2002 | Sartori | E01B 27/16 |
| | | | | 104/12 |
| 10,036,128 | B2 * | 7/2018 | Salciccia | E01B 27/16 |
| 10,421,101 | B2 * | 9/2019 | Hoefler | E01B 27/16 |
| 10,563,358 | B2 * | 2/2020 | Hoefler | E01B 27/16 |
| 10,633,801 | B2 * | 4/2020 | Steiner | H02K 33/04 |
| | | | | 310/29 |
| 10,808,362 | B2 * | 10/2020 | Seyrlehner | G05D 23/128 |
| | | | | 310/15 |

FOREIGN PATENT DOCUMENTS

| | | |
|---|---|---|
| RU | 2597258 C1 | 9/2016 |
| WO | 2017011775 A1 | 1/2017 |

* cited by examiner

TAMPING ASSEMBLY FOR TAMPING SLEEPERS OF A TRACK

FIELD OF TECHNOLOGY

The invention relates to a tamping assembly for tamping sleepers of a track, comprising a tamping unit having a lowerable tool carrier and oppositely positioned tamping tools, wherein each tamping tool is connected via a pivot arm to a squeezing drive for generating a squeezing motion, and wherein a vibration drive is provided for actuation of the tamping tools with a vibratory motion.

PRIOR ART

For maintenance of a track or after a track renewal, it is usually necessary to compact a ballast bed. For that purpose, aside from hand tampers, tamping assemblies are known which are arranged on track maintenance machines. During track tamping, the track maintenance machine moves along the track while tamping tines fastened to the tamping assembly are lowered into sleeper cribs and squeezed together.

Tamping assemblies for tamping sleepers of a track are already well known, such as, for example, from AT 350 097 B. Serving as vibration exciter is a rotatable eccentric shaft to which the squeezing drives are articulatedly connected for transmission of the oscillations to the tamping tines. In this design, the oscillation amplitude at the tamping tools is fixedly preset.

SUMMARY OF THE INVENTION

It is the object of the invention to indicate an improvement over the prior art for a tamping assembly of the type mentioned at the beginning.

According to the invention, this object is achieved by way of a tamping assembly as claimed. Dependent claims indicate advantageous embodiments of the invention.

The invention provides that the vibration drive comprises an electromagnetic actuator. The electromagnetic actuator constitutes a very robust and cost-effective solution for generating an oscillation and can be retrofitted with little expense on most of the existing tamping assemblies. Furthermore, the electromagnetic actuator offers a particularly low-noise solution for the vibration drive.

In an advantageous embodiment of the invention, the electromagnetic actuator comprises an anchor which is connected to a shaft, wherein the shaft is guided through a casing orifice by means of a slide sleeve. In this manner, a mechanical coupling of the shaft, connected to the anchor, to the squeezing drive leads to a forced oscillation transmission to the tamping tools. The slide sleeve offers a low-wear bearing of the shaft and prevents dust and dirt from entering the casing of the vibration drive.

It is further useful that the vibration drive comprises a casing in which cooling channels are arranged for cooling by means of a liquid cooling medium. By means of the cooling medium in the cooling channels, heat arising during operation is reliably dissipated. This increases the performance and the life span of the vibration drive.

An advantageous further development provides that the vibration drive is coupled to the tool carrier and to the squeezing drives by means of non-destructively detachable connections. As a result, the vibration drive can be detached from the tool carrier quickly and easily, if needed, should there be a defect during working operations. Also conceivable would be an adjustment to the local circumstances; if, for example, a greater or smaller oscillation amplitude is required, the appropriate vibration drive can be selected and adapted to the tool carrier.

It is further favourable if inside a casing, which is closed apart from passages, only one anchor is movably arranged, wherein the anchor is coupled to at least one squeezing drive. A vibration drive of this kind is of simple design and enables different combinations for oscillation transmission. Because of the few moving parts within the closed casing, the drive works almost wear-free.

An advantageous variant of the invention provides that a spring which presses the anchor against a cover of the casing is arranged inside the casing. Then, a pulsating electromagnetic force acts on the anchor in only one direction. A resetting force in the opposite direction is applied by means of the spring.

Favourably in this, the cover is arranged within the casing for adjustment in the oscillation direction. Thus, the oscillation amplitude of the anchor can be changed and adapted to the requirements of the particular work situation. For example, an amplitude adjustment takes place in the event of a changed ballast bed quality.

Another advantageous variant of the invention provides that the anchor is arranged for movement relative to two magnetic bodies (yokes) and two solenoids (excitation windings), and that the anchor is coupled in particular to both squeezing drives. An oscillation generation takes place by alternate energization of the two solenoids. In this variant, no resetting spring is required. A particularly simple design of the overall arrangement exists if both squeezing drives are coupled to the anchor by means of a respective shaft.

An additional variant of the invention provides that two anchors are movably arranged inside a casing which is closed apart from passages, and that each anchor is coupled to one of the two squeezing drives. In this manner, each squeezing drive can be actuated with a separate oscillation. For example, oppositely directed vibratory motions lead to a reduced vibratory stress of the tool carrier. Additionally, the compact design constitutes an advantage, especially when retooling existing tamping assemblies.

In a further development of this variant, a spring is associated with each anchor, the spring pressing the respective anchor against a partition arranged in the casing. Thus, the two electromagnetic actuators are housed in one casing in a particularly space-saving manner.

BRIEF DESCRIPTION OF THE DRAWINGS

The invention will be described below by way of example with reference to the accompanying drawings. There is shown in a schematic manner in.

DETAILED DESCRIPTION OF THE INVENTION

Figure 1:
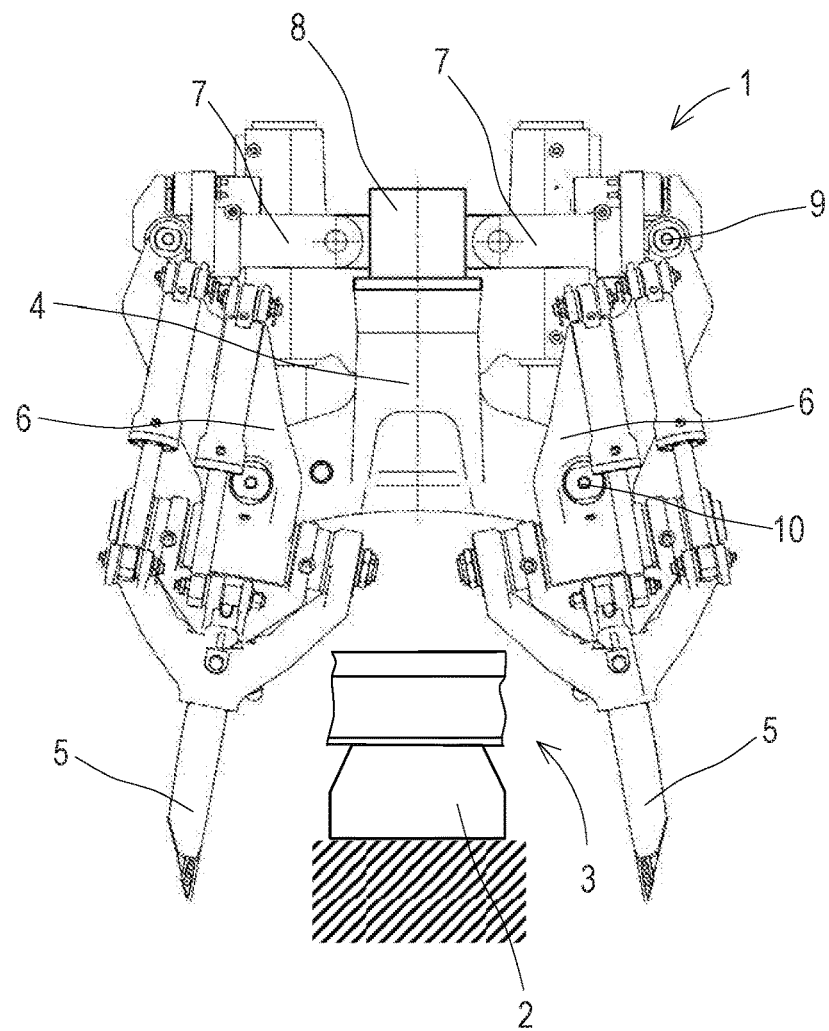
FIG. 1 a tamping unit of a tamping assembly
FIG. 2 an actuator with an electromagnet and spring
FIG. 3 an actuator with two electromagnets
FIG. 4 an actuator with two electromagnets and two springs

FIG. 1 shows a tamping unit 1 of a tamping assembly for tamping sleepers 2 of a track 3 with a lowerable tool carrier 4 and pairs of two oppositely positioned tamping tools 5. In a tamping assembly, several such tamping units 1 are arranged to be lowerable independently of one another and optionally transversely displaceable independently of one another. Such a tamping assembly is intended for being installed in a track tamping machine movable on a track, or a tamping satellite. In a multiple-sleeper tamping assembly, several tamping units are arranged one following the other in the longitudinal direction of the track.

The respective tamping tool 5 is connected to a vibration drive 8 via a pivot arm 6 and a squeezing drive 7. In particular, a connection of the respective pivot arm 6 to the associated squeezing drive forms an upper pivot axis 9. The respective pivot arm 6 is supported on the tool carrier 4 for rotation about a lower pivot axis 10. The vibration drive 8 is fastened to the tool carrier 4 by means of non-destructively detachable fastening elements, for example by screw connections, and likewise connected in a non-destructively detachable manner to the squeezing drives. In this way, a simple exchange of the vibration drive 8 can be accomplished.

Figure 2:
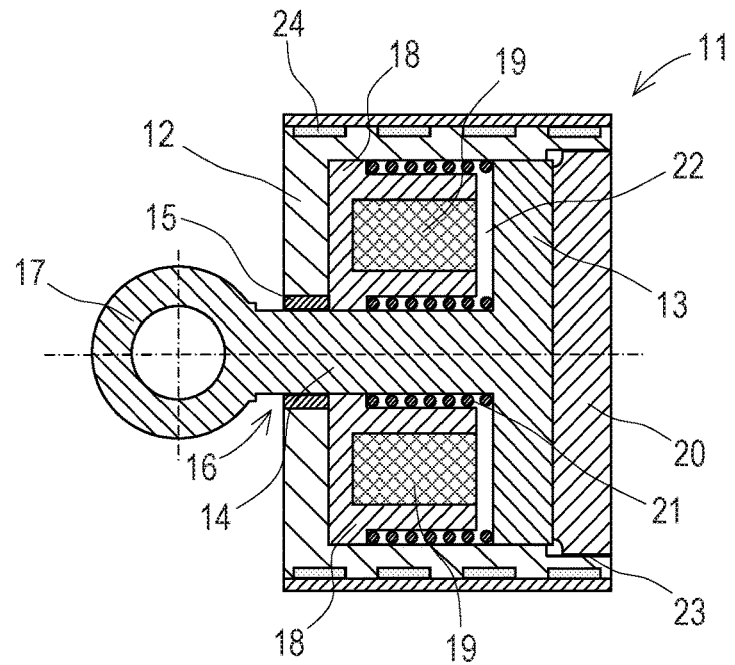

FIG. 2 shows an advantageous variant of an electromagnetic actuator 11. In the vibration drive 4, each squeezing drive 7 is associated with such an actuator 11. The electromagnetic actuator 11 comprises a cylinder-shaped casing 12. Inside the casing 12 is an anchor 13 which is connected to a shaft 14. The shaft 14 is guided by means of a slide sleeve 15 through a casing orifice 16. At one end of the shaft 14 guided through the casing orifice 16, there is a ring-shaped coupling device 17 to which the associated squeezing drive 7 is articulatedly connected.

Arranged in the casing is an electromagnet which comprises a magnetic body 18 (yoke) and a solenoid 19. At the anchor side, the casing 12 is closed by a cover 20. With the solenoid 19 currentless, a spring 21 presses the anchor 13 against the cover 20 so that an air gap 22 forms between anchor 13 and magnetic body 18. The cover 20 is adjustable relative to the casing 12 via an external thread 23 so that the air gap 22 between the magnetic body 18 and anchor 13 can be varied. In this manner, the oscillation amplitude transmitted to the tamping tools 5 can be adjusted to prevailing requirements.

A current flowing through the solenoid 19 sets up a magnetic field which pulls the anchor 13 in the direction of the magnetic body 18 and tensions the spring 21. In this, the magnetic field diminishes the air gap 22 so that field lines can close over a small magnetic resistance. With the solenoid 19 currentless, the magnetic field is cut down, and the spring 21 presses the anchor 13 back into the initial position. A pulsating current causes the desired vibration of the anchor 13, wherein the pulse intervals determine the vibration frequency. By pre-setting the current course by means of an adjustable control device, the frequency can be adapted in a simple way to the requirements of a tamping cycle. Thus, the frequency can be increased for a penetration operation into a ballast bed, and it can be decreased to zero in the lifted state of the tamping unit 1.

During conversion of the electrical energy into mechanical energy, heat is generated which advantageously is dissipated by a cooling medium. To that end, cooling channels 24 are arranged in the casing 12 in which the cooling medium circulates. Compared to air cooling, there is the advantage that a dust development automatically occurring in the environment of the tamping assembly has no effect on the cooling function.

Figure 3:
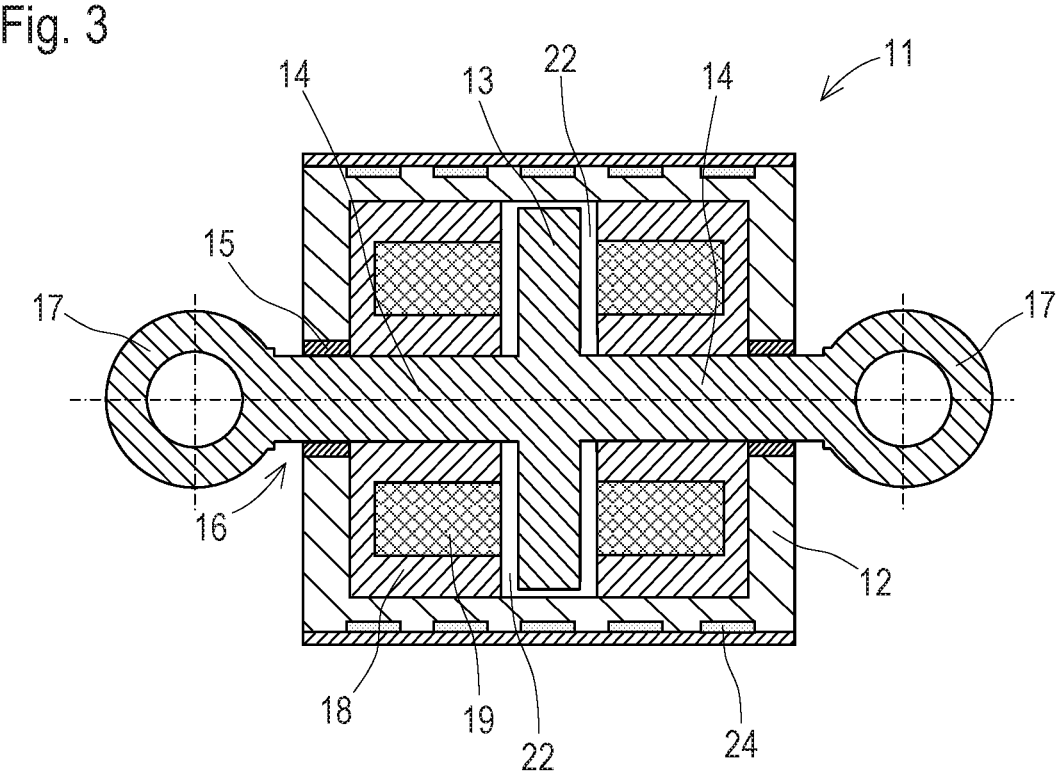

FIG. 3 shows another embodiment of the electromagnetic actuator 11. Here, inside the casing 12 a centrally positioned anchor 13 is arranged, to both sides of which a respective shaft 14 is fastened. Each shaft 14 is guided through the casing 12 by means of a slide sleeve 15 and articulatedly connected via a coupling device 17 to a squeezing drive 7.

The anchor 13 is arranged between two electromagnets, each comprising a magnetic body 18 and a solenoid 19. In the current-less state, the anchor 13 is positioned in the middle between the electromagnets, so that an equally large air gap 22 exists at both sides of the anchor 13. By alternatingly energizing the solenoids 19, the anchor 13 including the shafts 14 is moved back and forth. This oscillation is transmitted via the two squeezing drives 7 and the pivot arms 6 to the tamping tools 5. In this variant, lower currents and weaker magnetic fields are sufficient because no resetting springs need to be tensioned.

Figure 4:
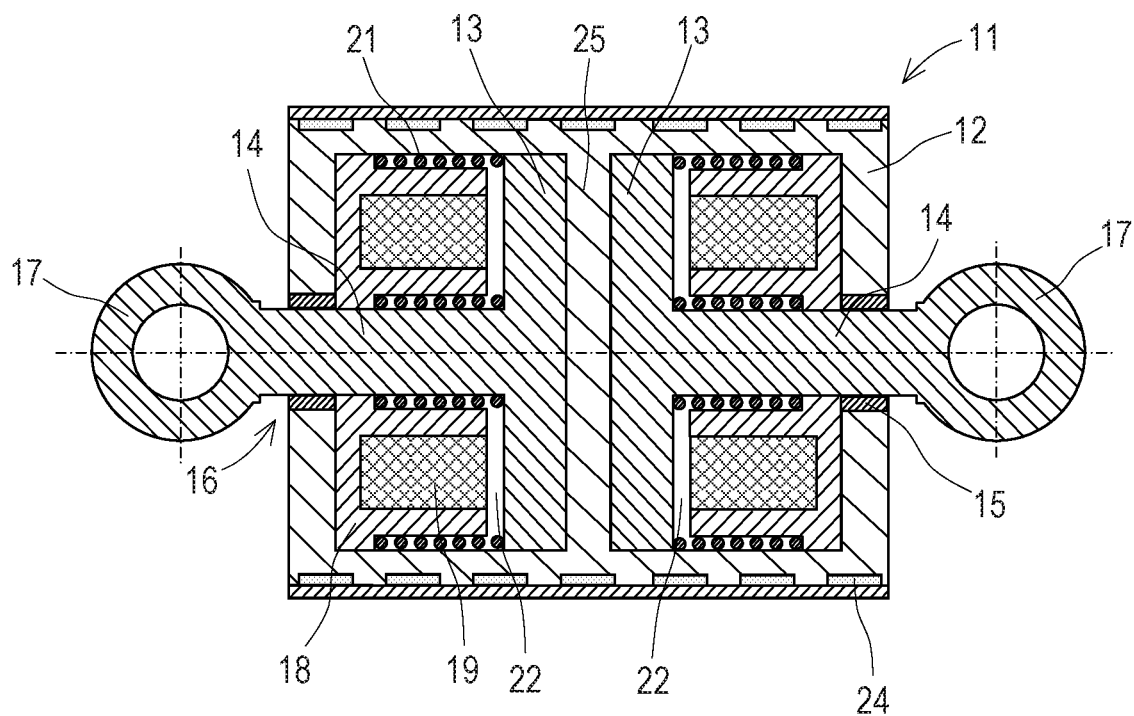

In FIG. 4, two actuators 11 having the operating principle according to FIG. 2 are arranged in a common casing 12. In this, the anchors 13 of the two actuators 11 are pressed against a common partition 25 by means of a respective spring 21. Here, the adjustability of the oscillation amplitude is done without in order to enable a compact design. This variant is suited particularly for retrofitting existing tamping units, wherein each tamping tool 5 can be actuated with a separate vibratory motion.

The geometric configuration of the individual elements can be adjusted to particular requirements. For example, the casing 12 can be cube-shaped. Also, the design of the anchors 13 and electromagnets can be adapted to the circumstances of a particular tamping unit 1. Guidelines in this are the oscillation forces and oscillation amplitudes to be generated as well as an available installation space. Additionally, several electromagnets can be arranged around the respective shaft 14.

In a particularly simple embodiment, the vibration drive 8 has no shaft 14. In this, only an anchor 13 is moved back and forth within a closed casing 12. The inertial forces of the mass of the anchor 13 act outward and are transmitted to the tamping tools 5.

It is additionally possible to arrange a separate vibration drive 8 on each tamping tool 5 or on each pivot arm 6. Then, the transmission via the respective squeezing cylinder 7 is omitted. For example, the lower pivot axis 10 in each case is actuated with a vibration motion, or the respective vibration drive 8 is arranged in the region of a tamping tool receptacle. Then, the particular tamping tool 5 is directly actuated with a corresponding vibratory motion.

The invention claimed is:

1. A tamping assembly for tamping sleepers of a track, the tamping assembly comprising:
   a tamping unit having a lowerable tool carrier and tamping tools positioned opposite one another;
   a squeezing drive for generating a squeezing motion, and pivot arms respectively connecting each of said tamping tools to said squeezing drive;
   a vibration drive for actuation of said tamping tools with a vibratory motion, said vibration drive being connected to said squeezing drive and to said tool carrier, and said vibration drive including an electromagnetic actuator; and
   said electromagnetic actuator including an anchor, an electromagnet with a magnetic yoke, and a solenoid.

2. The tamping assembly according to claim 1, wherein said anchor is connected to a shaft, and said shaft is guided through a casing orifice by way of a slide sleeve.

3. The tamping assembly according to claim 2, wherein said casing is closed except for passages, and only a single said anchor is movably arranged in said casing, and said anchor is coupled to at least one squeezing drive.

4. The tamping assembly according to claim 3, which comprises a spring disposed inside said casing and configured to press said anchor against a cover of said casing.

5. The tamping assembly according to claim 4, wherein said cover is mounted within said casing adjustably in an oscillation direction.

6. The tamping assembly according to claim 3, wherein said electromagnetic actuator comprises two magnetic bodies and two solenoids, and said anchor is arranged for movement relative to said magnetic bodies and said solenoids.

7. The tamping assembly according to claim 3, wherein said squeezing drive is one of two squeezing drives, and said anchor is coupled to both said squeezing drives.

8. The tamping assembly according to claim 2, wherein said anchor is one of two anchors movably arranged inside a casing which is closed apart from passages, and wherein each of said anchors is coupled to one of said two squeezing drives.

9. The tamping assembly according to claim 8, which comprises a spring respectively associated with each of said anchors and disposed to press the respective said anchor against a partition in said casing.

10. The tamping assembly according to claim 1, wherein said vibration drive comprises a casing and said casing is formed with cooling channels for cooling said vibration drive with a liquid cooling medium.

11. The tamping assembly according to claim 1, wherein said vibration drive is coupled to said tool carrier and to said squeezing drives by way of non-destructively detachable connections.

12. A tamping assembly for tamping sleepers of a track, the tamping assembly comprising:
a tamping unit having a lowerable tool carrier and tamping tools positioned opposite one another;
a squeezing drive for generating a squeezing motion, and pivot arms respectively connecting each of said tamping tools to said squeezing drive;
a vibration drive for actuation of said tamping tools with a vibratory motion, said vibration drive including an electromagnetic actuator;
said electromagnetic actuator including an anchor connected to a shaft, and said shaft being guided through a casing orifice by way of a slide sleeve;
said casing being closed except for passages, and only a single said anchor being movably arranged in said casing, and said anchor being coupled to at least one squeezing drive; and
a spring disposed inside said casing and configured to press said anchor against a cover of said casing.

13. A tamping assembly for tamping sleepers of a track, the tamping assembly comprising:
a tamping unit having a lowerable tool carrier and tamping tools positioned opposite one another;
two squeezing drives for generating a squeezing motion, and pivot arms respectively connecting each of said tamping tools to said squeezing drives; and
a vibration drive for actuation of said tamping tools with a vibratory motion, said vibration drive including an electromagnetic actuator;
said electromagnetic actuator including an anchor connected to a shaft, and said shaft being guided through a casing orifice by way of a slide sleeve;
said casing being closed except for passages, and only a single said anchor being movably arranged in said casing; and
said anchor being coupled to both said squeezing drives.

* * * * *